United States Patent
Kuncl et al.

(10) Patent No.: US 12,217,554 B2
(45) Date of Patent: Feb. 4, 2025

(54) MANAGING THE OPERATIONAL STATE OF A VEHICLE

(71) Applicant: Uber Technologies, Inc., San Francisco, CA (US)

(72) Inventors: Parker Ralph Kuncl, Seattle, WA (US); Eric Mai, Oakland, CA (US); Adam Jeremy Share, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 17/390,683

(22) Filed: Jul. 30, 2021

(65) Prior Publication Data

US 2021/0358232 A1    Nov. 18, 2021

Related U.S. Application Data

(63) Continuation of application No. 16/200,499, filed on Nov. 26, 2018, now abandoned.

(51) Int. Cl.
| | | |
|---|---|---|
| *G07C 5/00* | (2006.01) | |
| *G01C 21/34* | (2006.01) | |
| *G07C 5/08* | (2006.01) | |

(52) U.S. Cl.
CPC ........... *G07C 5/008* (2013.01); *G07C 5/0808* (2013.01); *G01C 21/3438* (2013.01)

(58) Field of Classification Search
CPC .. G07C 5/008; G07C 5/0808; G01C 21/3438; G01C 21/3407
See application file for complete search history.

(56) References Cited

U.S. PATENT DOCUMENTS

| | | |
|---|---|---|
| 10,248,913 B1 | 4/2019 | Gururajan et al. |
| 10,489,132 B1 | 11/2019 | Bloomcamp et al. |

(Continued)

FOREIGN PATENT DOCUMENTS

| | | |
|---|---|---|
| EP | 2 708 850 | 3/2014 |
| EP | 3140803 | 3/2017 |

(Continued)

OTHER PUBLICATIONS

United States Pre-Interview Communication, U.S. Appl. No. 16/200,490, filed Dec. 21, 2021, seven pages.

(Continued)

*Primary Examiner* — Rami Khatib
*Assistant Examiner* — Gabriel Joseph Rene Lambert
(74) *Attorney, Agent, or Firm* — Mahamedi IP Law LLP

(57) ABSTRACT

A network system facilitates management of the operational states of transportation vehicles. Within a system environment, the network system also coordinates transport service between service providers operating the transportation vehicles and service requestors operating client devices. A transportation vehicle includes a processor or computing device that can determine and change operational states of the transportation vehicle. The transportation vehicle communicates operational states to one or more devices in the environment. Operational states can be communicated as vehicle datasets using a communication port of the transportation vehicle. The network system and client devices can act to enhance transport service using vehicle datasets. For example, the network system and/or client devices can manage an operational state by changing the current operational state off the transportation vehicle to a different operational state. Transport service can be enhanced at various points during the transport service coordination.

19 Claims, 10 Drawing Sheets

(56) References Cited

U.S. PATENT DOCUMENTS

| | | |
|---|---|---|
| 2003/0125963 A1 | 7/2003 | Haken |
| 2004/0158483 A1 | 8/2004 | Lecouturier |
| 2005/0227704 A1 | 10/2005 | Ferra |
| 2005/0278063 A1 | 12/2005 | Hersh |
| 2006/0034201 A1 | 2/2006 | Umeda |
| 2006/0059023 A1 | 3/2006 | Mashinsky |
| 2006/0276960 A1* | 12/2006 | Adamczyk ............ G06Q 10/06 701/516 |
| 2008/0195428 A1 | 8/2008 | O'Sullivan |
| 2009/0005963 A1 | 1/2009 | Jarvinen |
| 2009/0176508 A1 | 7/2009 | Lubeck |
| 2009/0192851 A1 | 7/2009 | Bishop |
| 2011/0112717 A1 | 5/2011 | Resner |
| 2012/0253654 A1 | 11/2012 | Sun |
| 2013/0046526 A1* | 2/2013 | Yucel ................. G01C 21/3469 703/8 |
| 2014/0213238 A1 | 7/2014 | Giraud et al. |
| 2015/0324717 A1* | 11/2015 | Lord ............. G06Q 10/0631 705/7.13 |
| 2015/0339928 A1 | 11/2015 | Ramanujam |
| 2017/0069144 A1* | 3/2017 | Lawrie-Fussey .... G06Q 10/083 |
| 2017/0186248 A1 | 6/2017 | Fournier et al. |
| 2017/0327082 A1 | 11/2017 | Kamhi et al. |
| 2017/0345228 A1* | 11/2017 | Dibb ....................... G08G 1/017 |
| 2018/0162301 A1 | 6/2018 | Meng et al. |
| 2018/0202822 A1 | 7/2018 | DeLizio |
| 2018/0308191 A1* | 10/2018 | Matthiesen ...... G06Q 10/0631 |
| 2018/0322775 A1* | 11/2018 | Chase .................... G06N 5/022 |
| 2018/0356821 A1 | 12/2018 | Kentley-Klay et al. |
| 2019/0051174 A1* | 2/2019 | Haque ................... G01C 21/34 |
| 2019/0197430 A1* | 6/2019 | Arditi ................... G06N 20/00 |
| 2019/0197798 A1 | 6/2019 | Abari et al. |
| 2019/0204097 A1* | 7/2019 | Starns ................... G07C 5/008 |
| 2019/0303822 A1* | 10/2019 | Spoon ............... G06Q 10/0635 |
| 2019/0308633 A1 | 10/2019 | Hori et al. |
| 2020/0050198 A1 | 2/2020 | Donnelly |
| 2020/0104770 A1* | 4/2020 | Aich ..................... B60N 2/245 |
| 2020/0168008 A1 | 5/2020 | Kuncl et al. |
| 2020/0292337 A1* | 9/2020 | Starns ................... G06Q 10/20 |
| 2021/0209517 A1* | 7/2021 | Shimodaira ........... G08G 1/202 |

FOREIGN PATENT DOCUMENTS

| | | |
|---|---|---|
| EP | 3167414 | 5/2024 |
| EP | 3167426 | 6/2024 |
| GB | 2 501 075 | 10/2013 |

OTHER PUBLICATIONS

United States Office Action, U.S. Appl. No. 17/390,683, filed Apr. 9, 2021, 23 pages.

United States First Action Interview Office Action, U.S. Appl. No. 17/390,683, filed Nov. 4, 2020, five pages.

United States Preinterview First Office Action, U.S. Appl. No. 17/390,683, filed Jul. 10, 2020, four pages.

United States Office Action, U.S. Appl. No. 16/200,490, filed Jun. 3, 2022, 32 pages.

Petros Lalos: "A Framework for Dynamic Car and Taxi Pools with the Use of Positioning Systems", Future Computing, Service Computation, Cognitive, Adaptive, Content, Patterns, 2009. Computationworld '09: IEEE, Piscatawy, NJ, Nov. 15, 2009, pp. 385-391.

Yaoping Zhang—Vehicle scheme of Evacuated Tube Transportation in the future logistics system, Computer and Automation Engineering (ICCAE), 2010 The 2nd International Conference on, IEEE, Piscataway, NJ, USA, Feb. 26, 2010, pp. 190-192.

* cited by examiner

Table
500

| Example Information Included In Vehicle Datasets ||| 
|---|---|---|
| Vehicle Identification Number | Fuel Level | Horn |
| Make/Model | Mass Air Flow | Doors Open/Closed |
| Door Unlock/Lock | Manifold Absolute Pressure | Trunk Open/Closed |
| Year | Fuel Economy | Hood Open/Closed |
| Engine Type | Engine Load | Seatbelts |
| Transmission Type | Tire Pressure | Passengers Present |
| Key Position | Battery Voltage | Anti-lock Brakes |
| Gear Position | Lane Departure Warning | Traction Control |
| Clutch Position | Barometric Pressure | Stability Control |
| Parking Brake | Ambient Air Temperature | Forward Collision Warning |
| True Odometer | IntakeAir Temperature | Remote Door Lock/Unlock |
| Accelerator Pressure | Winshield Wipers | Remote Trunk Lock/Unlock |
| Brake Pressure | Headlights | Immobilization |
| Steering Wheel Angle | Fog Lights | Radio Channel/Volume |
| Coolant Temperature | Turn Signals | AC Compressor |
| Oil Life | Hazar Lights | Interior Lights |
| Oil Pressure | Alarm | GPS |
| Accelerometer | Velocity | Engine RPM |

FIG. 5

MANAGING THE OPERATIONAL STATE OF A VEHICLE

CROSS REFERENCE TO RELATED APPLICATIONS

This application is a continuation of co-pending U.S. application Ser. No. 16/200,499, filed Nov. 26, 2018, which is incorporated by reference in its entirety. Additionally, this application is related to co-pending U.S. application Ser. No. 16/200,499 filed Nov. 26, 2018.

FIELD

This description relates generally to obtaining information regarding the operational state of a transportation vehicle and more particularly leveraging that information to enhance service coordination applications.

DESCRIPTION OF RELATED ART

Coordinating high-quality services between service requestors and service providers using a network system within a system environment can be a challenging problem. In particular, with so many variables that can affect the quality of service coordination within the environment, ensuring high-quality service coordination for all parties participating in the service coordination is complex and error-prone. For example, something as simple as a transportation vehicle being too hot for a service requestor during transport service can negatively affect the service coordination experience.

In many circumstances, a service provider and service requestor communicate with one another during service coordination to facilitate high quality transport service. For example, the service provider and service requestor can discuss a temperature that would be comfortable to both. Unfortunately, in some cases, communication between the service provider and service requestor is not always feasible and does not always facilitate high-quality transport service.

SUMMARY

Client devices and/or a network system facilitate enhanced transport service as service providers coordinate transport service with service requestors in an operating environment. Generally, the client devices and/or the network system leverage vehicle datasets to enhance transport service. Vehicle datasets are obtained from a transportation vehicle operated by a service provider in an operating environment. As an example, vehicle datasets are obtained from an on-board diagnostics communication port communicatively coupled to a client device of the service provider. Vehicle datasets may be communicated between client devices and the network system via a network. A vehicle dataset may describe a variety of information describing the operational state of the transportation vehicle, including: vehicle make, vehicle model, speed, acceleration, vehicle settings, passengers, etc.

Client devices and/or the network system can enhance transport service at any number of times when client devices and the network system coordinate transport service. For example, transport service can be enhance before transport service assignment, in-route to a pickup location, on-trip from a pickup location to a destination location, after concluding transport service, etc.

BRIEF DESCRIPTION OF DRAWINGS

FIG. 5 is a table of example operational characteristics that can be included in a vehicle dataset, according to one example embodiment.

The figures depict various embodiment for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to various embodiments by way of illustration only. It should be noted that from the following discussion, alternative embodiments of the structures and methods disclosed herein will be readily recognized as viable alternatives that may be employed without departing from the principles of what is claimed.

I. System Environment

Network systems facilitate service coordination between two parties operating client devices within a system environment. For example, a network system may be used to coordinate a transportation service between a service requestor (e.g., a user operating a client device) and a service provider (e.g., a user operating a client device) via a network.

Service providers and network systems can be configured to utilize capabilities of service providers and their transportation vehicles to provide additional services and functionality. For example, in a system environment where a service provider operates a transportation vehicle including a communication port that can access vehicle datasets describing the operational state of the transportation vehicle, a network system can leverage the vehicle datasets to enhance the services provided by service provider.

II. Service Coordination

Figure 1:
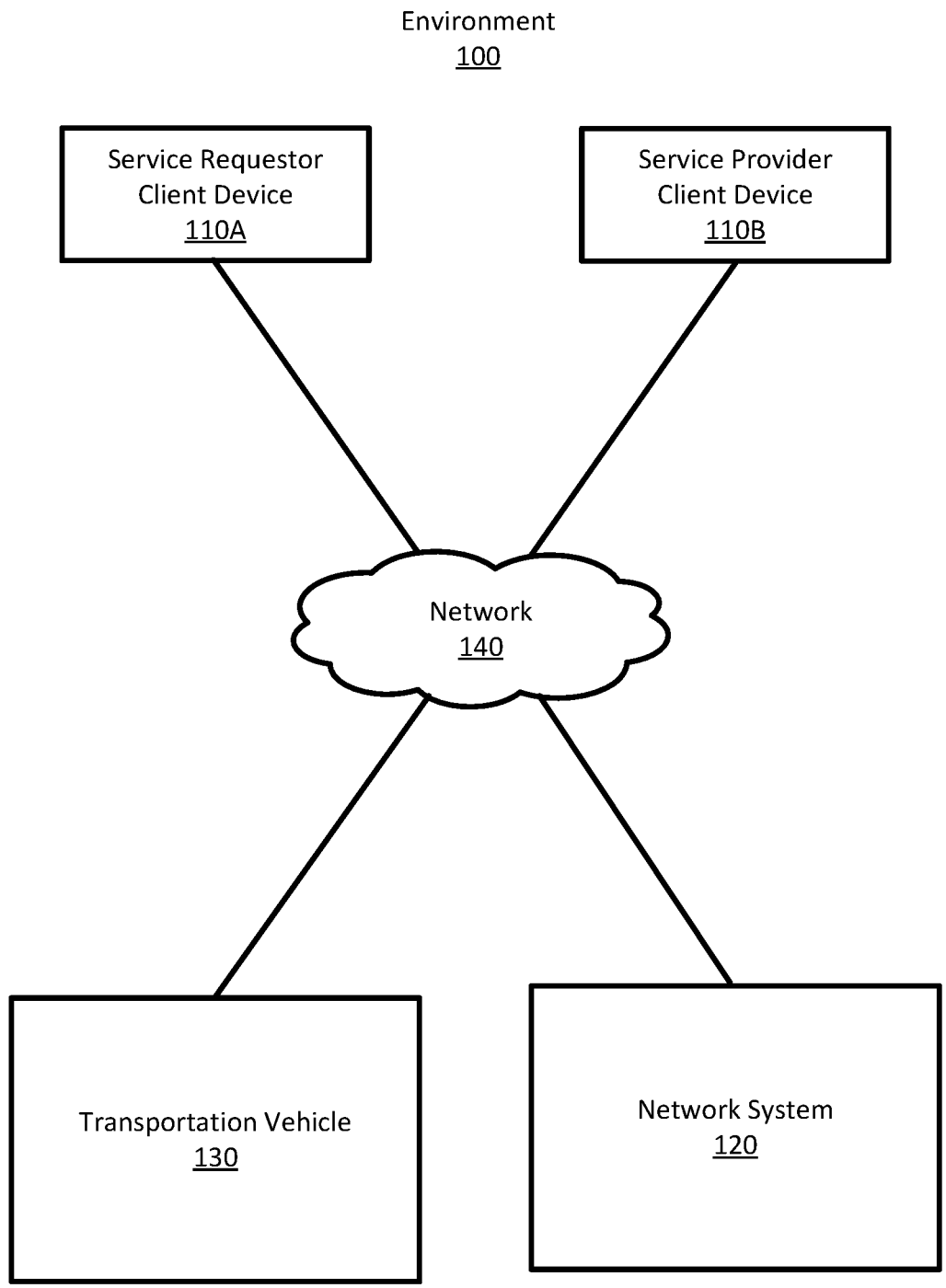
FIG. 1 is an illustration of a system environment for enhancing transport service by leveraging vehicle datasets describing operational characteristics of a transportation vehicle, according to one example embodiment.
Figure 2:
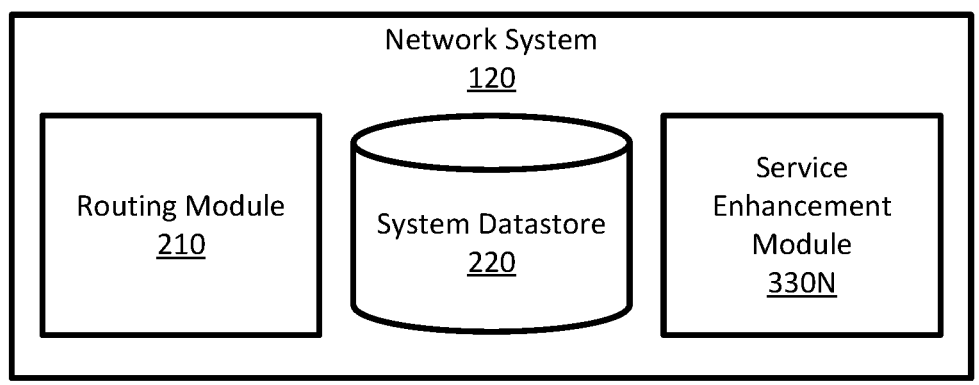
FIG. 2 is an illustration a network system in the system environment, according to one example environment.
Figure 3:
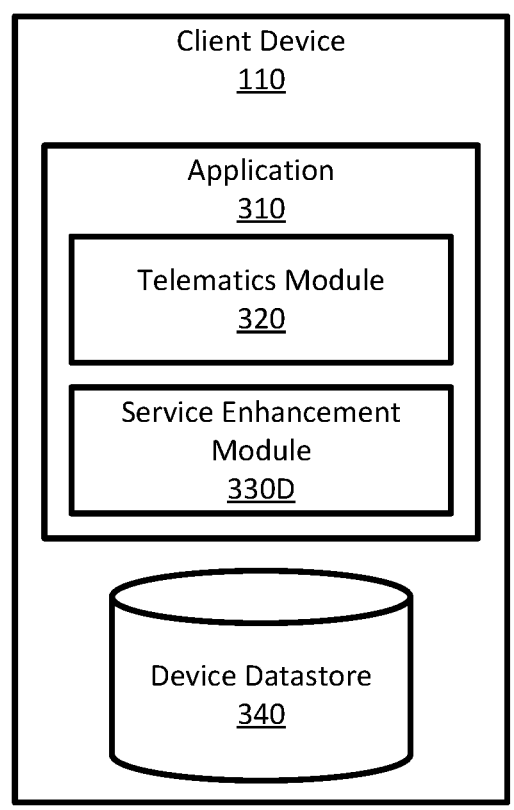
FIG. 3 is an illustration of a client device in the system environment, according to one example environment, according to one example embodiment.
Figure 4:
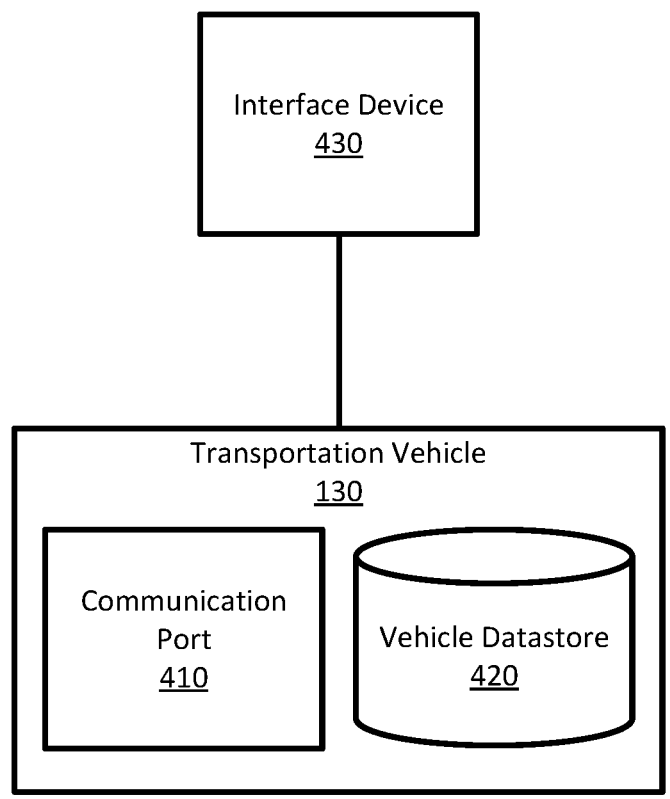
FIG. 4 is an illustration of a transportation vehicle in the system environment, according to one example embodiment.

FIG. 1 is an example system environment 100 that illustrates a network system 120, client devices 110, and a transportation vehicle 130 that enable service coordination via a network 140, according to one embodiment. FIG. 2 gives a more detailed view of modules within network system 120, FIG. 3 gives a more detailed view of modules within a client device 110 (e.g., service requestor client device 110A and service provider client device 110B), and FIG. 4 gives a more detailed view of modules within a transportation vehicle 130, according to some example embodiments. Some embodiments of network system 120, client devices 110, and transportation vehicle 130 have different modules than those described herein. Similarly, the functions can be distributed among the modules in a different manner than is described herein.

Network system 120 enables service coordination in the environment 100 between client devices 110. Users of network system 120 may include providers that provide a service to other users. In an example use case, a provider operates a transportation vehicle 130 to transport a user from a first location (e.g., pickup location) to a second location (e.g., a destination location). In some cases the transportation vehicle 130 may be autonomous. Other types of service include, for example, delivery of goods (e.g., mail, packages, or consumable items) or services. Although the embodiments herein for facilitating service coordination are described with respect to a transport service, the embodiments herein can be applied to any type of service that requires a service coordination via a network system 120.

As an example, network system 120 enables coordinating transport service between users of client devices 110 within the environment 100. In the context of the description, an operator of a transportation vehicle 130 (i.e., the service provider) provides the service of transporting a person (i.e., the service requestor) to a destination requested by the person. In one embodiment, transportation vehicle 130 includes all vehicles such as cars and motorcycles, as well as public transportation vehicles 130 such as trains, light rail, buses, etc. In some cases, the transportation vehicle 130 can be outfitted with a sensor suite that allows the user of client device 110 to obtain information about the road network, the environment 100, and the operational state of the transportation vehicle 130 as the transportation vehicle 130 traverses the road network.

Further, a client device 110 can correspond to a mobile computing device, such as a smartphone. In some cases, a client device 110 corresponds to an onboard computing system of an autonomous transportation vehicle 130. Network system 120 can also correspond to a set of servers and can operate with or as part of another system that implements network services. Network system 120 and client devices 110 comprise a number of "modules," which refers to hardware components and/or computational logic for providing the specified functionality. That is, a module can be implemented in hardware, firmware, and/or software (e.g., a hardware server comprising computational logic), other embodiments can include additional modules, can distribute functionality between modules, can attribute functionality to more or fewer modules, can be implemented as a standalone program or as part of a network of programs, and can be loaded into memory executable by processors.

In one embodiment, the transportation of a person from a pickup location to a destination location is referred to as a trip or a transport service. Referring to FIG. 2, routing module 210 of network system 120 calculates a route from the pickup location to the destination location along a set of road segments within the environment 100 based on a historical map of the road segments within the environment 100. In some cases routing module 210 can calculate a route from the current location of a service provider to a pickup location.

Generally, routing module 210 calculates transaction costs for transport services and coordinates those transport services. A transaction cost is a monetary payment from a service requestor to a service provider in exchange for the service provider transporting the service requestor to a destination location. Routing module 210 may calculate the transaction cost for a transport service based on the distance traveled along the route during the trip (and/or based on a duration of the trip, any applicable tolls, fees, etc.). Routing module 210 determines the distance traveled during the transport service using geographic information (e.g., telematics data) received from client devices (e.g., such as after completion of the transport service). In some example, other modules within the environment 100 can determine the distance traveled during the transport service. Further, other modules information from other modules may be used in determining transaction costs for a transport service.

Network system 120 receives (e.g., periodically) geographic information from a client device 110 included in a transportation vehicle 130 as the transportation vehicle 130 moves its position. The geographic information includes geographic points that describe a trip of the transportation vehicle 130. In one embodiment, the geographic information is global positioning system (GPS) information. Throughout the description, geographic information is referred to as telematics data, but the description herein can be applied to any other type of geographic coordinate system.

As shown in FIG. 1, network system 120 is in communication with a service provider client device 110B and the service requestor device 110A via a network(s) 140. In one embodiment, the network 140 is the Internet or any combination of a LAN, a MAN, a WAN, a mobile, wired or wireless network, a private network, or a virtual private network. While only a single client device 110A and a single service requestor device 110A are shown in FIG. 1, any number of client devices 110 can be in communication with network system 120 via the network 140. Further, while described as a service requestor device 110A and a service provider client device 110B, any client device 110 within the environment 100 can include functionality for being a service requestor or a service provider.

FIG. 3 illustrates a client device 110, according to one example embodiment. A client device 110 is an electronic device (e.g., a smartphone) that can interact with network system 120 over the network 140. As described herein, client devices 110 for service requestors and service providers are largely similar in that they can include an application 310 that facilitates transport service. The application 310 includes a telematics module 320 and a service enhancement module 330 to facilitate an enhanced transport service. The client device 110 may also include a device datastore 340 for storing any relevant information that can facilitate providing an enhanced transport service.

When the client device 110 is a service requestor device 110A, the service requestor device 110A is used by a person to request a transport service from a pickup location to a destination location via a client application 310 included in the service requestor device 110A. Application 310 allows the user of the service requestor device 110A to submit a transport service request, which network system 120 then processes in order to select an operator of a transportation vehicle 130 as a transport service provider.

According to examples, the transport service request may include (i) a user identifier (ID), (ii) a pickup location (e.g., a location identifier specified by the user or a location identifier of the current position of the service requestor device 110A as determined by a telematics module 320 included in the service requestor device 110A, (iii) a destination location, and/or (iv) a vehicle type. For example, the telematics module 320 uses sensors (e.g., a GPS receiver) included in the service requestor device 110A to determine the position of the service requestor device 110A at various instances in time. In one embodiment, the current position of the service requestor device 110A is represented by a location identifier such as latitude and longitude coordinates. The current position of the service requestor device 110A is also associated with a time stamp indicating the time and the date in which the telematics module 320 measured the current position of the service requestor device 110A. Alternatively, the pickup location of the service requestor device 110A may be manually inputted into the service requestor device 110A by the user of the device, such as by selecting a location on a map or in the form of an address including at least a street number and street name.

The coordination service, which is implemented by network system 120 and/or other servers or systems, can receive the transport service request over the network 140 and can select a service provider for the requestor. In one example, the coordination service can (i) identify a pool of service providers that are available to provide the requested service and satisfy one or more conditions (e.g., have the specified vehicle type, have sensor system, have a preferred route to the pickup location, and/or are within a predetermined distance or estimated travel time away from the pickup location), (ii) select a service provider from the pool of service providers, and (iii) transmit an assignment request to a service provider client device 110B. The invitation can include the pickup location so that the selected service provider can navigate to the pickup location for initiating the transport service for the requestor. If the selected service provider accepts the assignment request by providing input on the service provider client device 110B, application 310 transmits an assignment acceptance to network system 120. Accepting the assignment can associate the service provider and the service requestor for transport service and network system 120 can notify the service requestor device 110A accordingly.

When the client device is a service provider client device, it is, generally, an electronic device (e.g., a smartphone) operated by a service provider and located within the transportation vehicle 130 used to complete trips. The service provider client device 110B includes a client application 310. The client application 310 displays, on the service provider client device 110B, information about a trip that the service provider has agreed to provide, such as the pickup location, and/or navigation and/or mapping information instructing the service provider to travel to the pickup location. As referred to herein, the pickup location may be the location of the service requestor device 110A or a location specified by the user of the service requestor device 110A. The destination location may be the location the service provider ends transport service, or a location specified by the user of the service requestor device 110A. The client application 310 may also display, on the service provider client device 110B, the destination for the assigned trip if provided by the user of the service requestor device.

Client devices 110 include a telematics module 320. Telematics module 320 uses one or more sensors of client device 110 to identify telematics data from the service provider client device 110B and the service requestor device 110A. When client application 310 is a transport service coordination application, telematics module 320 can identify GPS data from the transportation vehicle 130 as the transportation vehicle 130 moves along one or more road segments and nodes to complete a trip. The GPS data of the transportation vehicle 130 (or client device 110) represents the transportation vehicle 130's position at different instances in time during a trip. For example, at time $T_1$, client device 110 can be at a particular GPS location, identified by a location identifier (e.g., latitude and longitude coordinates) and a time stamp indicative of the time and date when client device 110 measured its current position. If the transportation vehicle 130 is moving, at time $T_2$ client device 110 can be at a different GPS location. In this manner, client device 110 periodically measures the current position of the transportation vehicle 130 (e.g., every three seconds, every four seconds, etc.) and periodically provides GPS data that is representative of the position of the transportation vehicle 130 over time to network system 120. Alternatively, client device 110 may provide GPS data whenever new or updated measurements of the current position of the transportation vehicle 130 are taken or are available.

FIG. 4 illustrates a transportation vehicle 130 that service providers may use to provide transport service in system environment 100, according to one example embodiment. Transportation vehicle 130 includes a processor that facilitates determining (and/or changing) operational states of transportation vehicle 130. An operational state of transportation vehicle is any information regarding the transportation vehicle that can be diagnosed via sensors included in transportation vehicle 130. In some cases, an operational state of transportation vehicle can be changed by the processor. That is, transportation vehicle 130 is capable taking self-diagnostics about its operational state and taking actions to change the operational state.

Operational states may be communicated to connected devices using an industry standard digital communication port 410. Communication port 410 may communicate operational states via a standardized set of diagnostic codes to connected devices which identify operational states of transportation vehicle 130. For example, transportation vehicle 130 senses that the air pressure in a tire is too low, generates a diagnostic code for low tire pressure, and communication port 410 transmits the diagnostic code to a connected device.

Similarly, communication port 410 can be used to change transportation vehicle 130 operational states. For example, communication port 410 can receive an operational state from a connected device and implement that operational state using the processor of transportation vehicle 130. In some cases, changing an operational state can be used to correct a diagnosed malfunction, but could be used to change operational states in any number of other circumstances. For example, communication port 410 may receive an operational state to correct an engine timing and implement that operational state in the engine of transportation vehicle 130. In another example, communication port 410 may receive an operational state for a radio (e.g., a radio station) of transportation vehicle 130 and implement the operational state on the radio in response.

FIG. 4 also illustrates an interface device 430 connected to transportation vehicle 130. Interface device 430 allows client device 110 and network system 120 to communicate with transportation vehicle 130 via network 140. However, in some examples, client device 110 and network system 120 can communicate directly with transportation vehicle 130 without interface device 430. In one example, the interface device 430 is a Bluetooth transmitter/receiver connected to communication port 410, but could be any other type of standardized transmitter/receiver.

FIG. 5 illustrates a table 500 that provides example operational states of a transportation vehicle 130 that can be communicated via communication port 410 ("vehicle datasets" in aggregate). Vehicle datasets may be sent or received by any devices connected to a transportation vehicle 130 via communication port 410 using a signaling protocol. As one example, the communication port 410 is an OBD-II port and vehicle datasets are communicated using the ISO 14230 KWP2000 signaling protocol, but communication port 410 may be any other communication port 410 and use any other signaling protocol for vehicle datasets. Some vehicle datasets may be accessed from, or stored on, a vehicle datastore 420.

Referring again to FIG. 3, a client device includes a service enhancement module 330D. Service enhancement module 330D regulates communication between a client device 110 and communication port 410. That is, service enhancement module allows communication of vehicle datasets between a transportation vehicle 130 and a requestor (e.g., client device 110) via a network. In some examples, service enhancement module 330 regulates communication between interface device 430 connected to communication port 410. For example, interface device 430 may be a Bluetooth transmitter connected to the communication port 410 and service enhancement module 330 may regulate communication of vehicle datasets with transportation vehicle 130 via a Bluetooth connection. In other examples, service enhancement module 330 communicates vehicle datasets directly with transportation vehicle 130 via network 140 without an interface device 430. For example, transportation vehicle 130 may include a local wireless network. In this case, communication port 410 manages vehicle dataset communication with connected client devices 110 across network 140 (e.g., as a Wi-Fi radio).

Application 310 can also relay vehicle datasets received from communication port 410 to network system 120 via network 140. For example, service enhancement module 330 receives vehicle datasets from a Bluetooth transmitter connected to communication port 410 via a Bluetooth connection. In response, service enhancement module 330D communicates the vehicle datasets to network system 120 via a cellular data network. In other examples, communication port 410 can directly communicate vehicle datasets to network system 120 via network 140. For example, communication port 410 can communicate vehicle datasets to network system 120 via a cellular data network.

Turning to FIG. 2, a network system can also include service enhancement module 230. Service enhancement module 230 also facilitates enhance travel service. However, in this case, the service enhancement module 230 uses resources located on the network system 120 to facilitate transport service rather than resources located on client device 110. For example, service enhancement module 230 may leverage vehicle datasets from all of transportation vehicles 130 providing transport service in environment 100 to enhance transport service. Additionally, in some configuration, service enhancement module 230 can directly receive vehicle datasets from a transportation vehicle via a network. That is, the transportation vehicle 130 need not interface with client device 110 to transmit a vehicle dataset to network system 120 via network 140.

Herein, for convenience, when functionality of service enhancement module 230 of network system 120 and functionality of service enhancement module 330 of client device 110 is similar, for convenience, service enhancement module 230 and service enhancement module 330 may be referred to in aggregate as service enhancement module 230/330.

Service enhancement module 230/330 leverages vehicle datasets to enhance transport service between service providers and service requestors by communicating vehicle datasets between elements in environment 100. The following description provides several examples of how a service enhancement module 230/330 facilitates enhanced transport service by communicating vehicle datasets between client device 110, network system 120, and transportation vehicle 130.

III. Methods for Enhancing Transport Service with Vehicle Datasets

Figure 6:
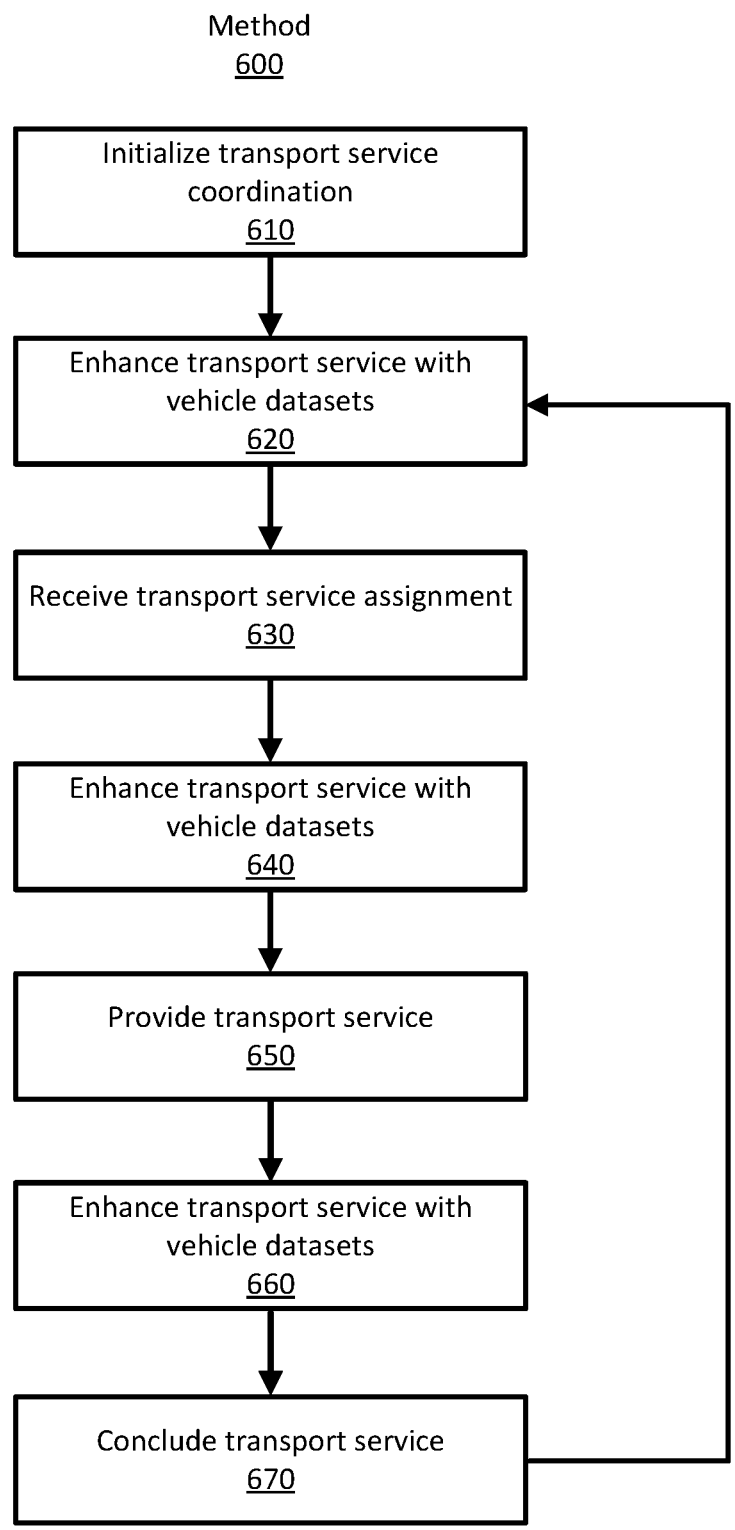
FIG. 6 is an example method of enhancing transport service by leveraging vehicle datasets describing the operational characteristics of a transportation vehicle, according to one example embodiment.

FIG. 6 is an illustration of a process flow for a method 600 for enhancing a transport service by communicating vehicle datasets in an environment 100, according to one example embodiment. In various embodiments, method 600 can include additional or fewer steps or the steps may be accomplished in other orders. Further, in various embodiments, method 600 can repeat any of the steps, or any series of steps, at any time.

To begin, a service provider initializes 610 application 310 on a service provider client device 110B to coordinate transport service in an environment 100. The service provider is operating a transportation vehicle 130 capable of generating and receiving vehicle datasets via a communication port 410. The service provider client device 110B includes an application 310 with a service enhancement module 330 that communicates vehicle datasets with the transportation vehicle 130 using communication port 410. The network system includes a service enhancement module 230. The service requestor transmits a transport service request to network system 120.

Service enhancement module 230/330 enhances 620 transport service using vehicle datasets. Enhancing transport service at step 620 is described in detail below.

Network system 120 transmits an assignment for the transport service to the service provider client device 110B. The service provider receives 630 and accepts the assignment for the transport service. Here, the assignment is to provide transport service to the service requestor from a pickup location to a destination location along a route. The service provider operates transportation vehicle 130 to move towards the pickup location.

Service enhancement module 230/330 enhances transport service using vehicle datasets. Enhancing transport service at step 640 is described in detail below.

Transportation vehicle 130 arrives at the pickup location and the service requestor enters the transportation vehicle 130. The service provider provides 650 transport service to the service requestor from the pickup location to the destination location along the route.

Service enhancement module 230/330 enhances transport service using vehicle datasets. Enhancing transport service at step 660 is described in detail below.

The service provider concludes 670 transport service when the transportation vehicle 130 arrives at the destination location and the service requestor exits the transportation vehicle 130. At this point the service enhancement module 330 can again enhance transport service.

In method 600, enhancing transport service can use service enhancement module 330 of client device 110 or service enhancement module 230 of network system 120. Further the method 600 may enhance transport service using vehicle datasets at any of steps 620, 640, and/or 660. In some examples, service enhancement module 330 may enhance transport service at other times or multiple times. Alternatively or additionally, service enhancement module 330 may enhance transport service at one step while not enhancing transport service at another step.

III. A Example Pre-Assignment Transport Service Enhancements

In some examples, service enhancement module 230/330 can enhance 620 transport service after a service provider initializes transport service and before a service provider receives a transport service request, i.e., a pre-assignment transport service enhancement.

Figure 7:
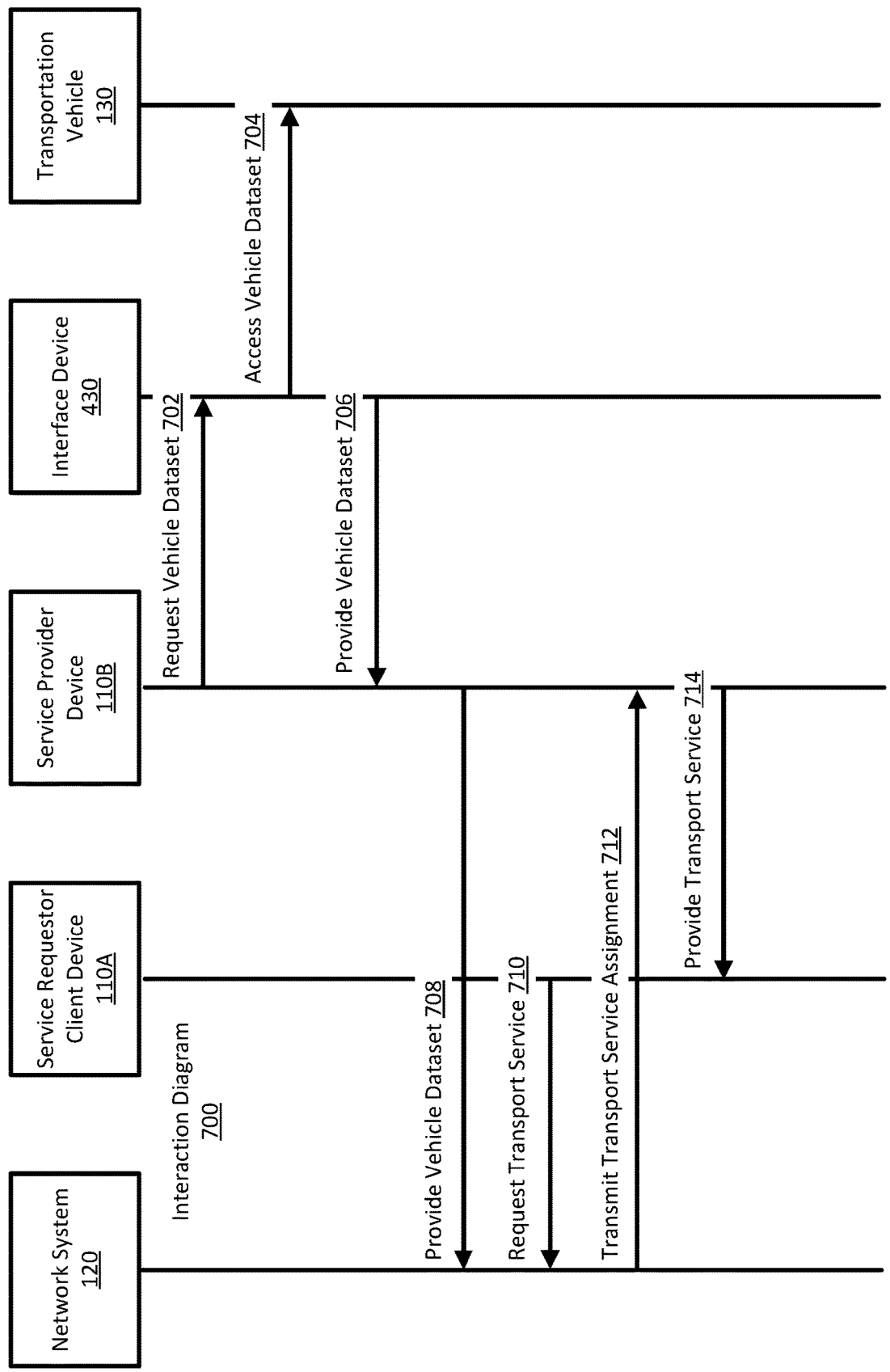
FIG. 7 is an interaction diagram illustrating an example pre-assignment transport service enhancement, according to one example embodiment.

FIG. 7 is an interaction diagram 700 illustrating a pre-assignment transport service enhancement between a service provider, a service requestor, and a network system 120 as they execute method 600. In this example, William and Erin are each operating a client device 110 with application 310 configured to coordinate transport service between service providers and service requestors. Here, William is a service requestor and uses his service requestor client device 110A to request transport service from service providers. Erin is a service provider and uses her service provider client device 110B to coordinate providing transport service to service requestors using transportation vehicle 130. Erin's transportation vehicle 130 is configured to communicate vehicle datasets via a communication port 410. In this example, Erin couples an interface device 430 (e.g., a Bluetooth transmitter/receiver) to communication port 410 such that her client device 110 can communicate vehicle datasets with transportation vehicle 130 when providing transport service.

Erin initializes application 310 on her client device and begins providing transport service in an area. Service enhancement module 330 of Erin's client device 110B requests 702 a vehicle dataset from interface device 430. In response, interface device 430 accesses 704 a vehicle dataset from transportation vehicle 130. In this case, the vehicle dataset includes information regarding the amount of gas stored in the gas tank of Erin's transportation vehicle 130. Interface device 430 provides 706 the vehicle dataset to Erin's service provider client device 110B and Erin's service provider client device 110B provides 708 the vehicle dataset to network system 120. Other service providers in the area provide similar vehicle datasets to network system 120.

William initializes application 310 and requests 710 transport service from network system 120 using his service requestor client device 110A. The transport service request includes a pickup location and a destination location.

Network system 120 receives the transport service request and determines a set of providers that can provide transport service to William using the vehicle datasets received from the service providers. In this example, William's transport service covers a long distance and would require a large amount of gas. Service enhancement module 230 of network system 120 determines, based on the vehicle dataset, that Erin's transportation vehicle 130 has enough gas to travel to the pickup location from her current location and provide transport service for William from the pickup location to the destination location without having to stop for additional fuel. As such, network system 120 selects Erin as the service provider for William.

Network system 120 transmits 712 a transport service assignment to Erin's service provider client device 110 and Erin accepts the assignment. The assignment indicates that Erin provide transport service to William from the pickup location to the destination location. The assignment, in one embodiment, also provides a route for Erin to travel from her current location to the pickup location and from the pickup location to the destination location.

After receiving the transport service assignment, Erin travels from her current location to the pickup location along the route. Once arriving at the pickup location, William enters Erin's transportation vehicle 130. Erin then provides 714 transport service for William from the pickup location to the destination location along the route. After arriving at the destination location, William exits the transportation vehicle 130 and Erin concludes the transport service. Erin's service provider client device again requests 702 a vehicle dataset from interface device 430, receives a vehicle dataset from the transportation vehicle 130 in response, and transmits the vehicle dataset to network system 120. In this manner network system 120 is continually informed of the amount of gas in Erin's transportation vehicle 130 and network system 120 may not assign her a transport service that requires more gas than is available in her transportation vehicle 130.

The aforementioned pre-assignment transport service enhancement is only an example. In various other configurations, service enhancement module 230/330 may use any information included in a vehicle dataset to enhance a transport service after a service requestor requests transport service and before a service provider receives a transport service assignment. The following examples illustrate other instances of a pre-assignment transport service enhancements. Each example includes a name of the enhancement, possible information included in the vehicle dataset, a device on which device the transport service enhancement can occur, and a brief description of the transport service enhancement. These examples are not intended to be an exhaustive list of pre-assignment transport service enhancements. Generally, a pre-assignment transport service is any transport service that is enhanced using a vehicle dataset obtained from a transportation vehicle 130 before a service provider accepts a transport service assignment.

Example A1: Appropriate Vehicle Size

Vehicle Dataset Information: Vehicle make, vehicle model, passengers present
Device: Network system 120
Description: Network system 120 receives a transport service request from a service requestor for a transport service. The service request includes a number of passengers that require a seat in the transportation vehicle 130 for the transport service. In this example, service enhancement module 230 accesses vehicle datasets including the vehicle make, vehicle model, and passengers present for transportation vehicles 130 operating in the environment 100. Service enhancement module 230 determines a transportation vehicle 130 with a sufficient number of available passenger spaces to provide transport service to the service requestor based on information in the vehicle datasets. Network system 120 assigns the service provider operating the determined transportation vehicle the transport service. This example can also function in a "transport service sharing" mode in which a single transportation vehicle 130 can provide transport service to multiple service requestors simultaneously. In this case, a service provider is only assigned additional service requestors when the transportation vehicle 130 includes sufficient passenger seating.

Example A2: Appropriate Storage Space

Vehicle Dataset Information: Vehicle make, vehicle model
Device: Network system 120
Description: Network system 120 receives a transport service request from a service requestor for a transportation vehicle 130. The transport service request includes a number of items of luggage to be transported. In this example, service enhancement module 230 accesses vehicle datasets including the vehicle make and vehicle model. Each vehicle make and model has an associated amount of storage space for items of luggage. Service enhancement module 230 determines a transportation vehicle 130 with a sufficient amount of storage space for items of luggage to provide transport service to the service requestor based on the information in the vehicle dataset. Network system 120 assigns the service requestor operating the determined transportation vehicle the transport service. This example can also function in a "transport service sharing mode" in which a single transportation vehicle 130 can provide transport to multiple service requestors simultaneously. In this case, a service provider will only be assigned additional service requestors when the transportation vehicle 130 includes sufficient storage space for any additional luggage.

Example A3: Maintenance Notifications

Vehicle Dataset Information: Oil life, oil pressure, fuel level, tire pressure, battery voltage, etc.
Device: Client device 110
Description: A service provider initializes the transport service application 310 to begin providing transport service to service requestors. The service provider's client device 110B accesses a vehicle dataset from transportation vehicle 130. In this example, the vehicle dataset includes information indicating that the operational state of transportation vehicle 130 is not suitable for providing a high-level transport service. For example, the transportation vehicle 130 may have low tire pressure, poor oil life, a low fuel level, etc. In response, service enhancement module 330 displays a notification on the service provider client device 110B indicating that improvements to the transportation vehicle 130 are necessary to provide transport service. In some examples, service enhancement module 330 can access network system 120 to obtain recommended sites in close proximity to improve the operational states of transportation vehicle 130 (e.g., mechanics, gas stations, etc.).

Example A4: Vehicle Confirmation

Vehicle Dataset Information: Vehicle identification number, vehicle make, vehicle model
Device: Network system 120
Description: A service provider initializes application 310 to begin providing transport service to service requestors. In this example, network system 120 associates each service provider with any of a vehicle identification number of a particular transportation vehicle 130, a vehicle make, and a vehicle model. Service provider client device 110B accesses a vehicle dataset from transportation vehicle 130. Here, the vehicle dataset includes information including a vehicle identification number, a vehicle make, and a vehicle model. Service provider client device 110B transmits the vehicle dataset to network system 120. In response, service enhance module 230 of network system 120 determines if the transportation vehicle 130 that the service provider is operating is the transportation vehicle 130 associated with the service provider. For example, a transportation vehicle 130 associated with a particular service provider is a Honda Fit. However, the received vehicle dataset indicates that the transportation vehicle 130 the service provider is operating is a Nissan Altima. In response, network system 120 does not assign the service provider transport service requests. Further, network system 120 transmits a notification to service provider client device 110B that they will be unable to provide transport service in their current transportation vehicle 130.

Example A5: Usage Threshold

Vehicle Dataset Information: Vehicle speed, true odometer, engine load
Device: Network system 120, client device 110
Description: A service provider initializes transport service application 310 to begin providing transport service to service requestors. The service provider client device 110B accesses a vehicle dataset from transportation vehicle 130. In this example, the vehicle dataset includes information including vehicle speed, true odometer, and engine load. In particular, the vehicle dataset includes information that the vehicle has been operated substantially continuously for the past 15 hours. Service enhancement module 230/330 determines that the service provider may be operating transportation vehicle 130 while in need of rest based on the vehicle dataset. In response, service provider client device 110B displays a notification encouraging the service provider to take a break from providing transport service. In other examples, if the vehicle dataset indicates that the transportation vehicle 130 has been operating substantially continuously for more than a threshold amount of time, network system may not assign the service provider to provide transport service to service requestors until the service provider takes a break.

Example A6: Efficient Assignments

Vehicle Dataset Information: Fuel economy
Device: Network system 120
Description: Service requestor client device 110A transmits a transport service request to network system 120. Network system 120 receives vehicle datasets from a number of service provider client devices 110B operating in the area. The vehicle datasets include information regarding how efficiently a transportation vehicle 130 is operating. Service enhancement module 230 determines an efficiency score for each of the service providers capable of providing the transport service using the vehicle datasets. The efficiency score is a quantification of how efficient a transportation vehicle 130 can be when travelling from their current location to the pickup location (or destination location) of the transport service. For example, a first service provider may have to travel up a steep incline for four miles to reach the pickup location while a second service provider may have to travel down an incline for three miles to reach the pickup location. In this case, the service enhancement module 230 determines that the first service provider has a higher efficiency score than the second service provider despite being further away and at a lower elevation. Service enhancement module 230 determines a higher efficiency score for the first service provider because the first service provider operates a transportation vehicle 130 that achieves a higher fuel efficiency than the transportation vehicle operated by the second service provider. As such, network system 120 assigns the transport service to the first service provider. In some cases, service enhancement module 330 may determine an efficiency score for a transportation vehicle 130 and transmit the efficiency score to network system 120.

In some examples, an efficiency score can be based on the transaction cost of the transport service. For example, if a provider has a highly fuel-efficient transportation vehicle, but the route for that provider would cause a much larger transaction cost, the efficiency score may be low. In some alternative example, a transaction cost can be based on the determined efficiency score. For example, a transaction cost may be adjusted higher or lower based on how efficiently a provider is able to provide transport service. Further service enhancement module 330 can determine and suggest operational states for a transportation vehicle based on an efficiency score.

III.B Example In-Route Transport Service Enhancements

In some examples, service enhancement module 330 can enhance 640 transport service after a service provider accepts an assignment and before a service provider begins transport service, i.e., an in-route transport service enhancement.

Figure 8:
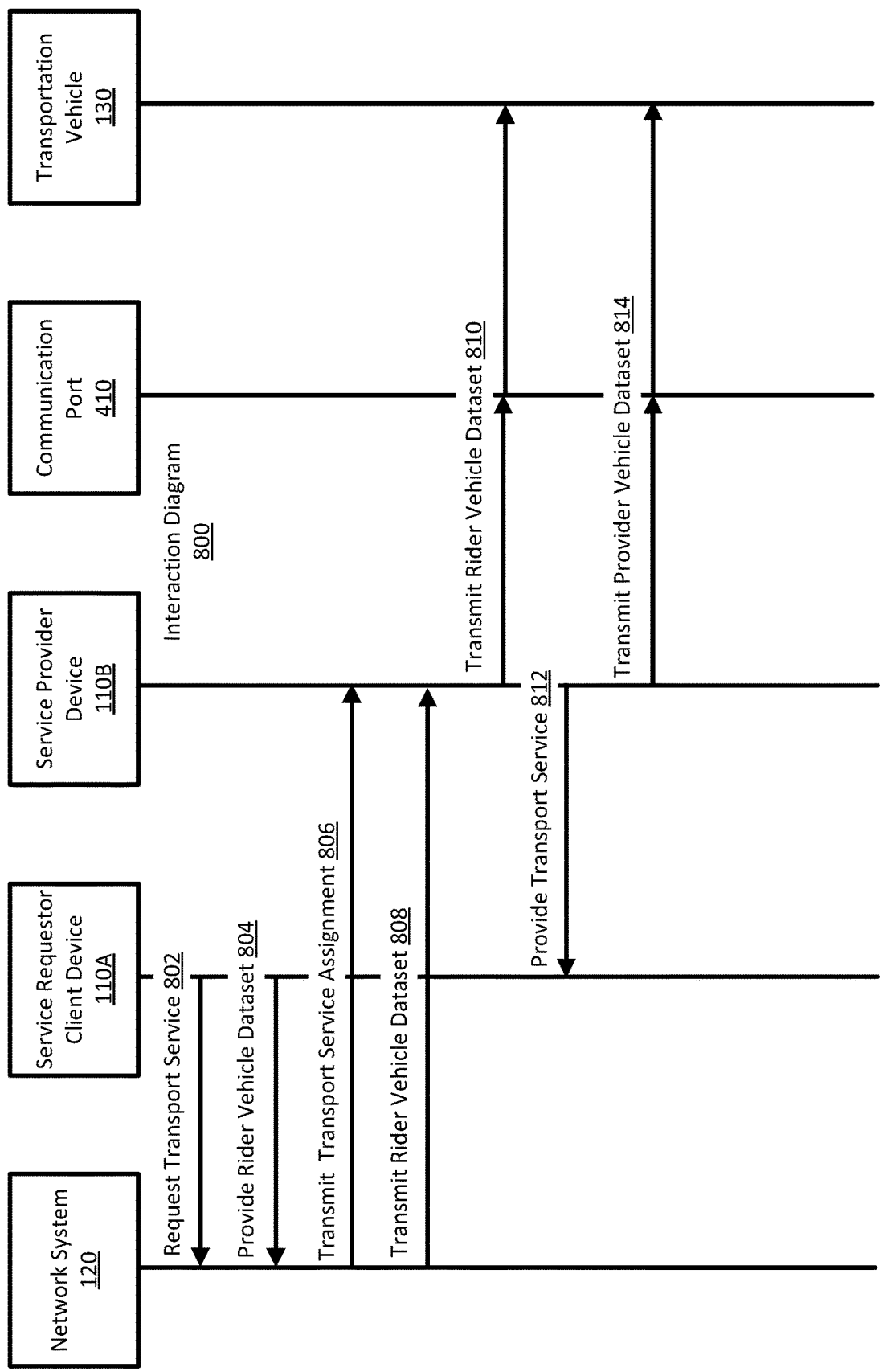
FIG. 8 is an interaction diagram illustrating an example in-route transport service enhancement according to one example embodiment.

FIG. 8 is an interaction diagram 800 illustrating an in-route transport service enhancement between a service provider, a service requestor, and network system 120 as they execute method 600. In this example, William and Erin are again acting as service requestor and service provider, respectively. Here, Erin's service provider client device 110B communicates with transportation vehicle 130 via a local wireless network 140 and communication port 410 regulates those communications.

Erin initializes application 310 on her service provider client device 110B and begins providing transport service in an area. William initializes application 310 on his service requestor client device 110A and requests 802 transport service from network system 120. The transport service request includes a pickup location and a destination location. In this example, William's transport service request also provides 804 a vehicle dataset that includes a set of preferred operational states ("rider vehicle dataset"). The set of preferred operational states are operational states that William prefers when using a transport service such as, for example, a temperature of the transportation vehicle 130 interior, a radio station, a reclining position of a seat, a retraction level of a window, etc. Similarly, Erin's service provider client device 110B includes a vehicle dataset that includes a set of preferred operational states ("provider vehicle dataset") for Erin that are stored on device datastore 340. When not providing a transport service to a service requestor, transportation vehicle 130 implements the provider vehicle dataset unless otherwise instructed. Additionally or alternatively, transportation vehicle 130 may implement the provider vehicle dataset when the provider preferences conflict with the requestor preferences.

Network system 120 transmits 806 a transport service assignment to Erin's service provider client device 110B indicating that Erin provide transport service to William from the pickup location to the destination location using transportation vehicle 130. The transport service assignment also provides a route for Erin to travel from her current location to the pickup location and from the pickup location to the destination location.

As Erin approaches the pickup location in transportation vehicle 130, network system 120 transmits 808 the rider vehicle dataset to Erin's service provider client device 110B. Erin's service provider client device 110B transmits 810 the rider vehicle dataset to the transportation vehicle 130 via the communication port 410 regulating the local wireless network 140. In some examples, the rider vehicle dataset can be transmitted directly from network system 120 to transportation vehicle 130 without Erin's service provider client device 110B relaying the information. In other examples, William's service requestor client device 110A can transmit the rider vehicle dataset to the local wireless network 140 when Erin's transportation vehicle 130 approaches the pickup location.

Transportation vehicle 130 implements the rider vehicle dataset before William enters the transportation vehicle 130 and Erin begins the transport service. For example, the transportation vehicle 130 may change the radio station from a National Public Radio station to a light rock station and change the temperature from 76° F. to 74° F. according to William's preferred operational states. Similarly, the transportation vehicle 130 may implement the rider vehicle dataset after William enters the transportation vehicle 130 and the transport service begins.

Erin then provides 812 transport service for William from the pickup location to the destination location along the route using transportation vehicle 130. After arriving at the destination location, William exits transportation vehicle 130 and Erin concludes the transport service.

After concluding the transport service, Erin's service provider client device 110B transmits 814 a provider vehicle dataset to the transportation vehicle 130 via communication port 410 regulating the local wireless network 140. In response, the transportation vehicle 130 implements Erin's preferred operational states. In some cases, rather than transmitting a provider vehicle dataset to transportation vehicle 130, Erin's service provider client device 110B can indicate to transportation vehicle 130 to implement vehicle settings stored on vehicle datastore 420.

Again, the aforementioned in-route transport service enhancement is only an example. In various other configurations, a service enhancement module 330 may use any information included in a vehicle dataset to enhance a transport service after a service requestor accepts an assignment and before a service provider provides transport service. Similar to Section III.A, some example in-route transport service enhancements are provided.

Example B1: Trip-Estimates

Vehicle Dataset Information: True odometer, fuel economy, accelerometer, vehicle speed, etc.

Device: Client device 110, network system 120

Description: While moving towards a starting point for a trip, a service provider client device accesses a vehicle dataset from transportation vehicle 130. The vehicle dataset includes information regarding operational states of transportation vehicle that can be used to estimate the profitability of an assigned transport service for a service provider. For example, the vehicle dataset can include the odometer information, fuel economy, vehicle speed, and accelerometer. Service enhancement module 230/330 determines an expected profitability for a transport service based on the received route and information included in vehicle dataset. For example, a trip for a transport service is five miles long and significant portions of the route that are uphill and include stop-lights. As such, service enhancement module 230/330 predicts that the expected profitability for the trip is $15.43 based on the fuel economy of the transportation vehicle and the expected transaction cost for the transport service. Service enhancement module 230/330 can also predict that the expected profitability of the trip is more or less than other service providers providing a transport service along a similar route. In this case, service enhancement module 230/330 can generate notifications for display on service provider client device 110B on methods to improve profitability for the trip (e.g., speeds, acceleration profiles, etc.).

Example B2: Transportation Vehicle Verification

Vehicle Dataset Information: Vehicle make, vehicle model, vehicle identification number, interior lights, etc.
Device: Client device 110, network system 120
Description: While driving towards a starting point for a trip, service enhancement module 230 of network system 120 provides a vehicle dataset to a service requestor waiting at the starting point. The vehicle dataset includes operational states that allows a service requestor to verify that they are approaching a transportation vehicle 130 operated by a service provider that has been assigned to them. For example, the provided vehicle dataset can include a vehicle identification number, an interior light setting, and a credential for communication port 410. In this example, once a transportation vehicle 130 that has been assigned to a service requestor arrives at the pickup location, the service requestor approaches the transportation vehicle. The service requestor interacts with their service requestor client device 110A and service enhancement module 330 transmits the received vehicle dataset to transportation vehicle 130. In response to receiving the vehicle dataset, transportation vehicle 130 changes the color of the interior lighting (e.g., green) to indicate to the service requestor that they are approaching the correct transportation vehicle. In some cases, communication port 410 can verify that the received vehicle dataset is intended for transportation vehicle 130 based on the vehicle identification number included in the vehicle dataset. In a counter example, if the service requestor approaches an incorrect transportation vehicle 130, transportation vehicle 130 can change the color of the interior lighting (e.g., red) to indicate to the service requestor that they approaching an incorrect transportation vehicle 130.

Example B3: Ingress Facilitation

Vehicle Dataset Information: Vehicle make, vehicle model, vehicle identification number, remote door locks, remote trunk locks
Device: Client device 110, network system 120
Description: Network system 120 assigns a service provider to provide transport service to a service requestor from a pickup location to a destination location along a route using transportation vehicle 130. When transportation vehicle 130 approaches the pickup location, service enhancement module 230/330 provides a vehicle dataset to transportation vehicle 130. The vehicle dataset causes transportation vehicle 130 to automatically unlock the doors of transportation vehicle 130 such that the service provider can easily enter transportation vehicle 130. In some examples, the vehicle dataset that unlocks doors is received from the service requestor client device 110A waiting at the pickup location as transportation vehicle 130 approaches. In some cases, service enhancement module 330 can determine which door(s) to unlock based on the location of transportation vehicle 130 and the location of the service requestor. In still other examples, the vehicle dataset can unlock the trunk if the service requestor indicates that they have a piece of luggage for the transport service. Similarly, vehicle datasets can be used to facilitate egress from transportation vehicle 130 in a similar manner.

III.C Example On-Trip Transport Service Enhancements

In some examples, service enhancement module 330 can enhance 660 transport service after a service provider begins providing transport service to a service requestor and before a service provider concludes providing transport service to a service requestor, i.e., an on-trip transport service enhancement.

Figure 9:
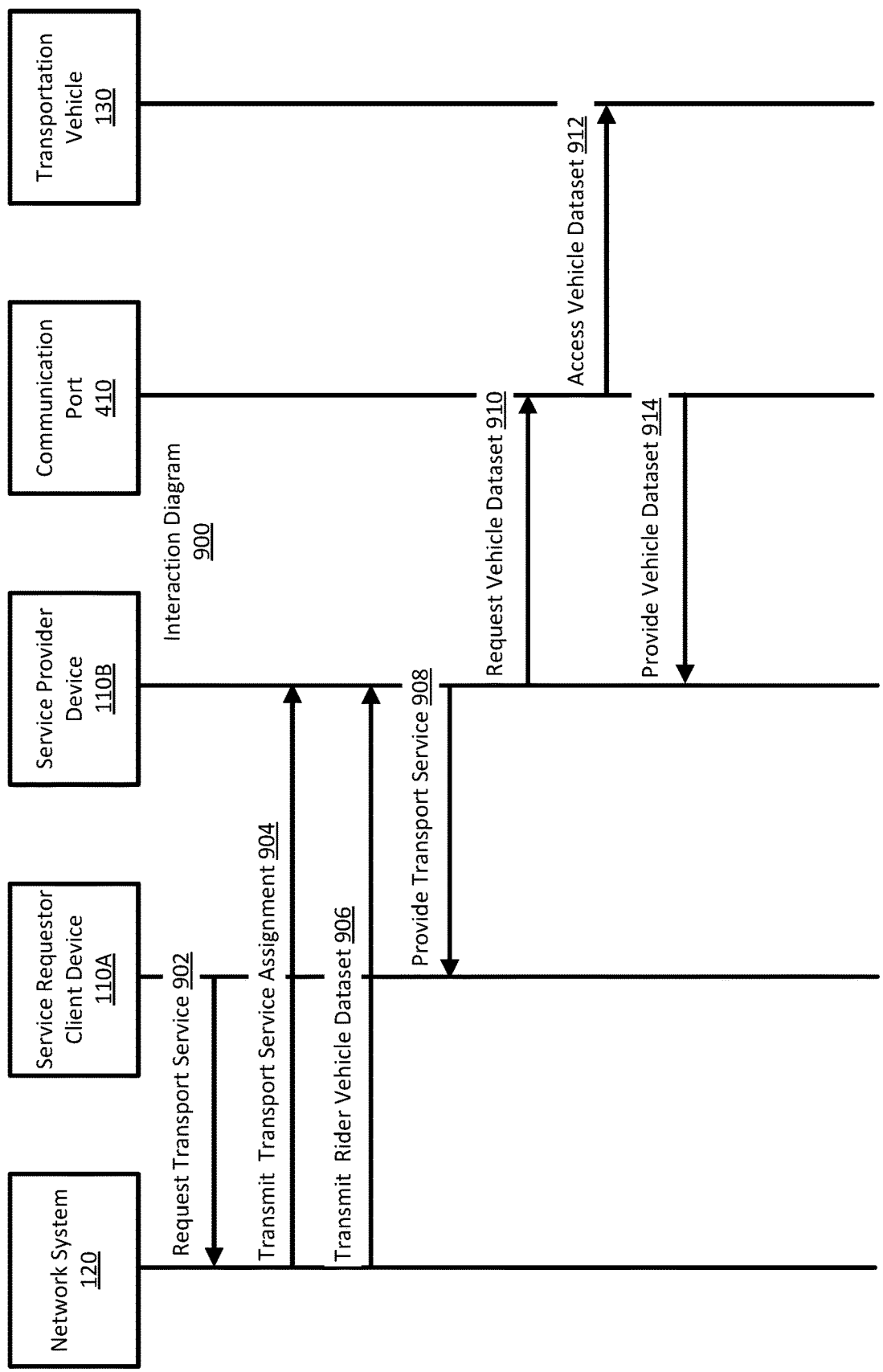
FIG. 9 is an interaction diagram illustrating an example on-trip transport service enhancement, according to one example embodiment.

FIG. 9 is an interaction diagram 900 illustrating an on-trip transport service enhancement between a service provider, a service requestor, and a network system 120 as they execute method 600. In this example, William and Erin are again acting as a service requestor and service provider, respectively. Erin's service provider client device 110B is directly connected to communication port 410 to communicate vehicle datasets. Again, Erin has a provider vehicle dataset and William has a rider vehicle dataset. William's rider vehicle dataset is stored on system datastore 220. In particular, the rider vehicle dataset includes a threshold overvelocity. That is, William has indicated a threshold velocity over the speed limit he is comfortable travelling. In this example, William is not comfortable travelling over the speed limit at any point during transport service.

Erin initializes application 310 on her service provider client device 110B and begins providing transport service in an area. William initializes application 310 on his service requestor client device 110A and requests 902 transport service from network system 120. The transport service request includes a pickup location and a destination location. Network system 120 transmits 904 a transport service assignment to Erin to provide transport service to William from the pickup location to the destination location. Network system 120 also transmits 906 William's rider vehicle dataset. The transport service assignment also provides a route for Erin to travel from her current location to the pickup location and from the pickup location to the destination location.

Erin uses transportation vehicle 130 to travel from her current location to the pickup location. Once Erin arrives at the pickup location, William enters the transportation vehicle 130, and Erin begins to provide 908 transport service to William.

As Erin provides 908 transport service for William from the pickup location to the destination location along the route, Erin's client service provider client device 110B requests 910 a vehicle dataset via communication port 410. In response, communication port 410 accesses 912 a vehicle dataset from transportation vehicle 130 and provides 914 the vehicle dataset to Erin's service provider client device 110B. In this example, the vehicle dataset includes operational states regarding Erin's driving characteristics (e.g., braking characteristics, speed characteristics, etc.). Service enhancement module 330 of Erin's service provider client device 110B analyzes the vehicle dataset and determines that Erin is driving faster than the speed limit along the route contrary to the information included in William's rider vehicle dataset. In response, service enhancement module 330 encourages Erin to reduce her speed to enhance Williams transport service experience. In some examples, service enhancement module 330 may also communicate a vehicle dataset to transportation vehicle 130 to automatically reduce (or limit) the velocity of transportation vehicle 130 according to information included in the rider vehicle dataset. Service enhancement module 230 of the network system 120 can provide similar functionality.

Erin arrives at the destination location, William exits the transportation vehicle 130, and Erin concludes the transport service.

As a more specific example, the route from the pickup location to the destination location includes a road segment along a highway with a speed limit of 65 mph. When moving with the flow of traffic, the speed of transportation vehicle 130 reaches 68 mph. Erin's service provider client device 110B accesses a vehicle dataset including the transportation vehicle 130's current velocity. Service enhancement module 330 determines that Erin is travelling faster than the speed limit of the highway, contrary to the information provided in the rider vehicle dataset. In response, service enhancement module 330 displays an on-screen indication on Erin's service provider client device 110B to reduce her speed to enhance William's transport service experience.

Again, the aforementioned on-trip transport service enhancement is only an example. In various other configurations, a service enhancement module 330 may use any information included in a vehicle dataset to enhance a transport service while a service provider provides transport service to a service provider. Similar to section III.A, some example on-trip transport service enhancements are provided.

Example C1: On-Trip Enhancement Notifications

Vehicle Dataset Information: True odometer, accelerator pressure, brake pressure, fuel economy, tire pressure, accelerometer, vehicle speed, etc.
Device: Client device 110
Description: While on a trip, a service provider client device accesses a vehicle dataset from transportation vehicle 130. The vehicle dataset includes information regarding operational states of transportation vehicle that can be monitored and improved to enhance travel service. In one example, the vehicle dataset includes brake pressure and fuel economy of transportation vehicle 130. Service enhancement module 330 determines that transportation vehicle 130 is not operating in a fuel-efficient manner and that the brake pressure is too high, too often. That is, a service provider is hard-breaking too often while providing transport service. Service enhancement module 330 determines that reducing the amount of hard-breaking while providing transport service would increase the fuel efficiency of transportation vehicle 130. As such, service enhancement module 330 displays a notification on a service provider client device 110B encouraging the service provider operating transportation vehicle 130 to modify her driving characteristics. In another example, the vehicle dataset includes information regarding seatbelts and whether or not passengers are present in each seat. Here, service enhancement module 330 determines that a seat including a passenger does not have a buckled seatbelt. In response, service enhancement module 330 displays a notification on the service provider client device 110B as to which passengers do not have buckled seatbelts. The service provider asks the passengers indicated by the notification to buckle their seatbelts.

Example C2: Rider Vehicle Modifications

Vehicle Dataset Information: Radio station, air condition, seat position, window position, etc.
Device: Client device 110
Description: While on a trip, network system 120 provides an authentication key for communication port 410 to a service requestor being transported by a service provider in transportation vehicle 130. The authentication key allows the service requestor client device 110A to communicate vehicle datasets with transportation vehicle 130 while on the trip. In this example, application 310 is configured to allow a service requestor to control operational states of transportation vehicle 130 by providing vehicle datasets to transportation vehicle 130. For example, a service requestor may provide a vehicle dataset that changes the position of their seat, changes the air conditioner setting, or changes the radio station, etc. Further, application 310 of a service requestor client device 110A is configured to display settings that can be controlled by the service requestor while on a trip. So, for example, application 310 can display a radio tuner that allows a service requestor to input a radio station setting. Service enhancement module 330 generates and transmits a vehicle dataset to transportation vehicle 130 that tunes the radio station of transportation vehicle 130 to the radio station selected by the service requestor.

Example C3: Automated Emergency Dispatch

Vehicle Dataset Information: Velocity, accelerometer, air bags, etc.
Device: Client device 110
Description: While on a trip, a service provider operating transportation vehicle 130 is rear-ended by another driver. Service provider client device 110B accesses a vehicle dataset including information indicating that transportation vehicle 130 has been in an accident. For example, the vehicle dataset can include information regarding a sudden change in velocity, or that an airbag has been deployed. As such, service enhancement module 330 determines that transportation vehicle 130 has been in an accident and automatically contacts emergency services using network 140.

III.D Example Post-Trip Transport Service Enhancements

In some examples, service enhancement module 230/330 can enhance transport service after a service provider concludes transport service and before a service provider accepts a new transport service assignment, i.e., a post-trip transport service enhancement. Post-trip transport service enhancements can function similarly to the interaction diagram of FIG. 7, but may be used to enhance a transport service in a different manner. As such, a thorough example will not be explicitly described. However, several examples of a service enhancement module 330 providing post-trip transport service enhancement are provided.

Example D1: Odometer Verification

Vehicle Dataset Information: Velocity, odometer, etc.
Device: Network system 120
Description: In some cases, network system 120 may inaccurately determine a number of miles travelled by a service provider when providing a transport service. For example, in a large city with tall buildings, telematics data can be prone to error because of the buildings interfering with GPS signals. After concluding transport service, transportation vehicle 130 generates a vehicle dataset including operational states that can be used to validate telematics data for the trip. For example, the vehicle dataset can include odometer information such that service enhancement module 230 can determine that the miles travelled as indicated by the telematics data matches the miles travelled as indicated by the vehicle dataset. Verifying the miles travelled allows network system 120 to more accurately determine the transaction cost for the provided transport service. Similarly, verifying the miles travelled allows network system 120 to prevent service providers from spoofing GPS information to unfairly inflate transaction costs.

Example D2: True Cost Transaction Costs

Vehicle Dataset Information: Velocity, odometer, fuel efficiency, brake pressure, ambient temperature, etc.
Device: Network system 120
Description: In some cases, a number of miles travelled on a trip or an amount of time travelled on a trip may not accurately reflect the true cost of the trip for the service provider (e.g., engine wear, decreased fuel efficiency, etc.). Service enhancement module 230 can leverage vehicle datasets to determine a true cost of a transport service for a service provider. For example, after concluding transport service, transportation vehicle generates a vehicle dataset including information that can more accurately indicate the true cost of providing the transport service. The vehicle dataset may indicate that a trip was up a substantial incline, in stop-and-go traffic, or in harsh weather conditions. As such, service enhancement module 230 may determine an adjusted transaction cost based on the received vehicle dataset that more accurately reflects the cost of the trip to the service provider. For example, if the fuel efficiency for a trip was very low because the ambient temperature outside transportation vehicle was very low, service enhancement module 330 may increase the transaction cost for the service requestor accordingly.

III.E Other Example Transport Service Enhancements

Service enhancement module 330 can enhance transport service at any time during method 600. Further, any process described in any enhancing transport service can be used at any time and in any combination.

Example E1: Service Provider Verification

Vehicle Dataset Information: Velocity, accelerometer, brake pressure, etc.
Device: Network system 120
Description: Network system 120 stores a service provider profile in system datastore 220. Each service provider profile includes a set of service provider driving characteristics that describe how the service provider operates a transportation vehicle 130 associated with the service provider client device 110B. For example, the service provider profile may include average velocity, average hard braking, acceleration profiles, etc. of a service provider while they provide transport service to a service requestor using transportation vehicle 130. As such, vehicle datasets received from transportation vehicle 130 can be used to verify that the operator of transportation vehicle 130 is the service provider associated with transportation vehicle 130. For example, the driving characteristics included in a vehicle dataset received from a service provider client device 110B providing transport service using transportation vehicle 130 are dissimilar from the normal driving characteristics included in vehicle datasets received from the service provider client device 110B. In this case, service enhancement module 230 determines that the current operator of transportation vehicle 130 is likely not the service provider associated with transportation vehicle 130 and service provider client device 110B. Service enhancement module 330 stops assigning transport service to service provider client device 110B until the driving characteristics in vehicle datasets are similar to the driving characteristics in the service provider profile. This example can also be used to determine if a service provider is overly tired, intoxicated, or in some other way impaired from providing a high-quality transport service Example E2: Verified Service Providers Vehicle Dataset Information: Velocity, accelerometer, brake pressure, etc.
Device: Network system 120
Description: Network system 120 stores a service provider profile in system datastore 220. Each service provider profile includes an indication as to whether or not a service provider has been verified. A driver becomes verified once service enhancement module 230 receives vehicle datasets with sufficient information indicating that the service provider is a safe driver. The information can include velocity, acceleration, mechanical information, etc. For example, a service provider operating a transportation vehicle has a service provider profile indicating that they are a verified driver. However, transportation vehicle 130 operated by the service provider generates and transmits a vehicle dataset to network system 120 indicating that the tire pressure of transportation vehicle 130 is too low. In response, network system 120 changes the service provider profile from verified to unverified until a vehicle dataset is received indicating the tire pressure is at an adequate level. Network system 120 may use the verified or unverified status of a service provider when determining which service provider to assign a transport service. For example, network system 120 may not assign a transport service to unverified service providers. In another example, a service provider may become verified successfully completing safe transport service (e.g., under speed limit, limited hard breaking, etc.) a threshold number of times. In this case, network system 120 may preferentially assign a transport service to verified service providers.

Example E3: Earnings Display

Vehicle Dataset Information: Fuel efficiency, maintenance notifications, brake pressure, etc.
Device: Client device 110
Description: Application 310 on a service provider client device 110A can include a display showing the earnings for the service provider when providing transport service. For example, the service provider client device can show the average per-trip earnings of a service provider or the aggregate earnings of the service provider when providing transport service. In this example, service enhancement module 330 can access information included in a vehicle dataset to more accurately determine the earnings of a service provider. For example, vehicle datasets can include information describing the fuel efficiency and maintenance notifications of a transportation vehicle 130 while providing transport service. In this case, service enhancement module 330 may determine adjusted earnings that more accurately reflect the earnings of a service provider operating transportation vehicle 130. For example, an unadjusted earnings may not reflect the fuel efficiency of a transportation vehicle while the adjusted earning do reflect the fuel efficiency of a transportation vehicle.

Example E4: Tax Preparation

Vehicle Dataset Information: Odometer
Device: Network system 120
Description: In some cases, the distance travelled by a service provider in a transportation vehicle 130 while providing transport service can be used as a tax benefit. In this case, service enhancement module 230 can access a vehicle dataset, or aggregate vehicle datasets, to determine the number of miles travelled by a service provider in a given amount of time. Service enhancement module can provide the number of miles travelled to the service provider to use for tax purposes.

IV. Example Computer System

Figure 10:
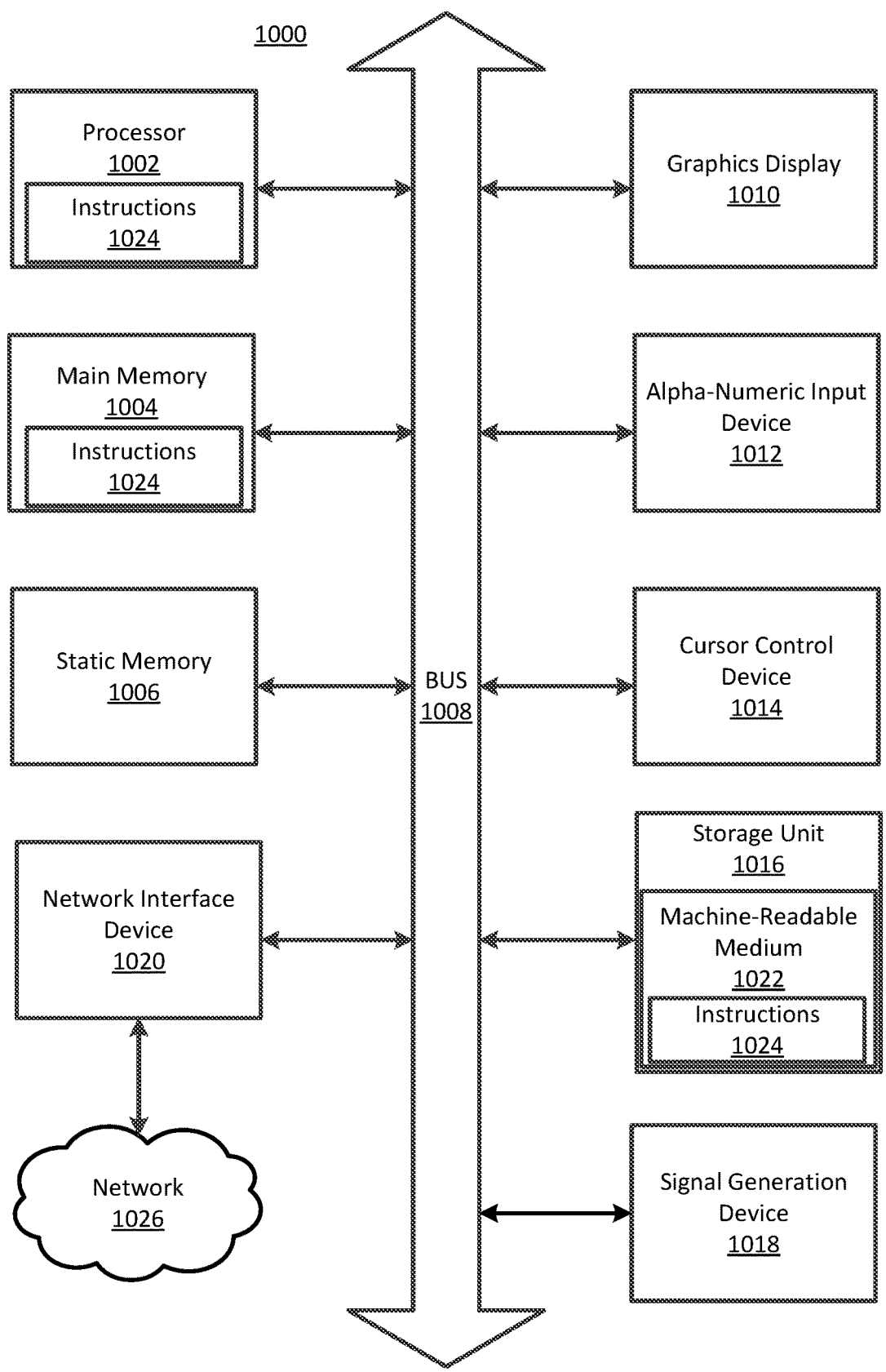
FIG. 10 is an illustration of an example computer that may be used in the system environment.

FIG. 10 is a block diagram illustrating components of an example machine for reading and executing instructions from a machine-readable medium. Specifically, FIG. 1 shows a diagrammatic representation of network system 120 and client device 110 in the example form of a computer system 1000. The computer system 1000 can be used to execute instructions 1024 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processing units (generally processor 1002). The processor 1002 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1000 also includes a main memory 1004. The computer system may include a storage unit 1016. The processor 1002, memory 1004, and the storage unit 1016 communicate via a bus 1008.

In addition, the computer system 1000 can include a static memory 1006, a graphics display 1010 (e.g., to drive a plasma display panel (PDP), a liquid crystal display (LCD), or a projector). The computer system 1000 may also include alphanumeric input device 1012 (e.g., a keyboard), a cursor control device 1014 (e.g., a mouse, a trackball, a joystick, a motion sensor, or other pointing instrument), a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. For example, the instructions 1024 may include the functionalities of modules of the system 120 described in FIG. 1. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 may be transmitted or received over a network 1026 (e.g., network 140) via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store the instructions 1024. The term "machine-readable medium" shall also be taken to include any medium that is capable of storing instructions 1024 for execution by the machine and that cause the machine to perform any one or more of the methodologies disclosed herein. The term "machine-readable medium" includes, but not be limited to, data repositories in the form of solid-state memories, optical media, and magnetic media.

V. Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for assigning a service provider for a travel service based on an operational state of a transportation vehicle, the method comprising:
   obtaining, over one or more networks, real-time vehicle data of a plurality of transportation vehicles, each transportation vehicle of the plurality of transportation vehicles providing the vehicle data using one or more on-board sensors, the vehicle data of each transportation vehicle including (i) at least one operational parameter indicating an efficiency of the transportation vehicle while being operated, and (ii) data indicating a model of the transportation vehicle;
   receiving, over the one or more networks, a request from a service requestor for a transport service from a starting location to an ending location;
   for each of the plurality of transportation vehicles, (i) determining a distance of travel from a current location of the transportation vehicle to the starting location, and from the starting location to the ending location; (ii) determining an efficiency score for the transportation vehicle based on the vehicle data obtained from that transportation vehicle; and (iii) determining an amount of time in which the transportation vehicle has been operating continuously;
   selecting one of the plurality of transportation vehicles based, at least in part, on (i) the amount of time determined the selected transportation vehicle has been operating continuously; (ii) the determined distance of each of the plurality of transportation vehicles; and (i the efficiency score of each of the plurality of transportation vehicles; and,
   transmitting, over the one or more networks, an assignment request to a client device associated with the selected transportation vehicle.

2. The method of claim 1, further comprising:
   determining, based on the obtained vehicle data and the starting location or the ending location, a suitability of each of the plurality of transportation vehicles for providing the transport service, the suitability indicating whether each transportation vehicle is capable of providing the transport service; and
   responsive to the suitability indicating that a respective transportation vehicle is incapable of providing the transport service, determining that an associated service provider is not a candidate service provider for the transport service.

3. The method of claim 2, further comprising:
   responsive to the suitability indicating that the respective transportation vehicle is incapable of providing the transport service, providing a maintenance notification regarding the operational state of the respective transportation vehicle to the service provider.

4. The method of claim 3, further comprising providing the respective transportation vehicle indicated in the maintenance notification a route to a maintenance provider based on the operation state of the respective vehicle.

5. The method of claim 1, further comprising:
   while the service provider is providing the transport service, obtaining, over the one or more networks, vehicle data describing an operational state of a transportation vehicle associated with the service provider; and
   determining, based on the obtained vehicle data, a suitability of the transportation vehicle to continue providing the transport service.

6. The method of claim 1, further comprising:
   while the service provider is providing the transport service, obtaining, over the one or more networks, vehicle data describing an operational state of a transportation vehicle associated with the service provider; and
   providing, based on the obtained vehicle data, a maintenance notification to the service provider.

7. The method of claim 1, further comprising transmitting the efficiency scores for each of the plurality of transportation vehicles to a network system.

8. A non-transitory computer-readable storage medium storing computer program instructions for assigning a service provider for a transport service based on an operational state of a transportation vehicle, the computer program instructions, when executed by one or more processors, causing the one or more processors to:
   obtain, over one or more networks, real-time vehicle data of a plurality of transportation vehicles, each transportation vehicle of the plurality of transportation vehicles providing the vehicle data using one or more on-board sensors, the vehicle data of each transportation vehicle including (i) at least one operational parameter indicating an efficiency of the transportation vehicle while being operated, and (ii) data indicating a model of the transportation vehicle;
   receive, over the one or more networks, a request from a service requestor for a transport service from a starting location to an ending location;
   for each of the plurality of transportation vehicles, (i) determine a distance of travel from a current location of the transportation vehicle to the starting location, and from the starting location to the ending location; (ii) determine an efficiency score for the transportation vehicle based on the vehicle data obtained from that transportation vehicle; and (iii) determining an amount of time in which the transportation vehicle has been operating continuously;
   selecting one of the plurality of transportation vehicles based, at least in part, on (i) the amount of time determined the selected transportation vehicle has been operating continuously; (ii) the determined distance of each of the plurality of transportation vehicles; and (iii) the efficiency score of each of the plurality of transportation vehicles; and transmit, over the one or more networks, an assignment request to a client device associated with the selected transportation vehicle.

9. The non-transitory computer-readable storage medium of claim 8, wherein the computer program instructions, when executed by the one or more processors, further cause the processors to:

determine, based on the obtained vehicle data and the starting location or the ending location, a suitability of each of the plurality of transportation vehicles for providing the transport service, the suitability indicating whether each transportation vehicle is capable of providing the transport service; and responsive to the suitability that a respective transportation vehicle is incapable of providing the transport service, determine that an associated service provider is not a candidate service provider for the transport service.

10. The non-transitory computer-readable storage medium of claim 9, wherein the computer program instructions, when executed by the one or more processors, further cause the one or more processors to:

responsive to the suitability indicating that the respective transportation vehicle is incapable of providing the transport service, provide a maintenance notification regarding the operational state of the respective transportation vehicle to the service provider.

11. The non-transitory storage medium of claim 10, wherein the computer program instructions, when executed by the one or more processors, further cause the processors to:

provide the respective transportation vehicle indicated in the maintenance notification a route to a maintenance provider based on the operation state of the respective vehicle.

12. The non-transitory computer-readable storage medium of claim 8, wherein the computer program instructions, when executed by the one or more processors, further cause the one or more processors to:

while the service provider is providing the transport service, obtain, over the one or more networks, vehicle data describing an operational state of a transportation vehicle associated with the service provider; and determine, based on the obtained vehicle data, a suitability of the transportation vehicle to continue providing the transport service.

13. The non-transitory computer-readable storage medium of claim 8, wherein the computer program instructions, when executed by the one or more processors, further cause the one or more processors to:

while the service provider is providing the transport service, obtain, over the one or more networks, vehicle data describing an operational state of a transportation vehicle associated with the service provider; and provide, based on the obtained vehicle data, a maintenance notification to the service provider.

14. The non-transitory computer-readable storage medium of claim 8, wherein the computer program instructions, when executed by the one or more processors, further cause the processors to transmit the efficiency scores for each of the plurality of transportation vehicles to a network system.

15. A system comprising: one or more processors; and a non-transitory computer-readable storage medium storing computer program instructions for assigning a service provider for a travel service based on an operational state of a transportation vehicle, the computer program instructions, when executed by the one or more processors, causing the one or more processors to:

obtain, over one or more networks, real-time vehicle data of a plurality of transportation vehicles, each transportation vehicle of the plurality of transportation vehicles providing the vehicle data using one or more on-board sensors, the vehicle data of each transportation vehicle including (i) at least one operational parameter indicating an efficiency of the transportation vehicle while being operated, and (ii) data indicating a model of the transportation vehicle;

receive, over the one or more networks, a request from a service requestor for a transport service from a starting location to an ending location;

for each of the plurality of transportation vehicles, (i) determine a distance of travel from a current location of the transportation vehicle to the starting location, and from the starting location to the ending location; (ii) determine an efficiency score for the transportation vehicle based on the vehicle data obtained from that transportation vehicle; and (iii) determining an amount of time in which the transportation vehicle has been operating continuously;

selecting one of the plurality of transportation vehicles based, at least in part, on (i) the amount of time determined the selected transportation vehicle has been operating continuously; (ii) the determined distance of each of the plurality of transportation vehicles; and (iii) the efficiency score of each of the plurality of transportation vehicles; and, transmit, over the one or more networks, an assignment request to a client device associated with the transportation vehicle.

16. The system of claim 15, wherein the computer program instructions, when executed by the one or more processors, further cause the processors to transmit the efficiency scores for each of the plurality of transportation vehicles to a network system.

17. The system of claim 15, wherein the computer program instructions, when executed by the one or more processors, further cause the processors to:

determine, based on the obtained vehicle data and at least the starting location or the ending location, a suitability of each of the plurality of transportation vehicles for providing the transport service, the suitability indicating whether each transportation vehicle is capable of providing the transport service; and responsive to the suitability that a respective transportation vehicle is incapable of providing the transport service, determine that an associated service provider is not a candidate service provider for the transport service.

18. The system of claim 17, wherein the computer program instructions, when executed by the one or more processors, further cause the one or more processors to:

responsive to the suitability indicating that the respective transportation vehicle is incapable of providing the transport service, provide a maintenance notification regarding the operational state of the respective transportation vehicle to the service provider.

19. The system of claim 18, wherein the computer program instructions, when executed by the one or more processors, further cause the processors to:

provide the respective transportation vehicle indicated in the maintenance notification a route to a maintenance provider based on the operation state of the respective vehicle.

\* \* \* \* \*